United States Patent Office 3,459,745
Patented Aug. 5, 1969

3,459,745
**10-AMINO SUBSTITUTED DIBENZOCYCLO-
HEPTADIENE DERIVATIVES**
Jean Clement Fouche, 32 Rue Jean Perrin,
Seceaux, France
No Drawing. Filed Mar. 22, 1965, Ser. No. 441,866
Claims priority, application France, Mar. 27, 1964,
969,038; July 23, 1964, 982,796; Feb. 4, 1965,
4,426
Int. Cl. C07d 51/70; C07c 87/40; A61k 27/00
U.S. Cl. 260—240          13 Claims

ABSTRACT OF THE DISCLOSURE

The invention provides new dibenzo[a,d]cyclohepta-
dienes substituted in the 10-position by an amino, alkyl-
amino, hydroxyalkylamino, dialkylaminoalkyl, pyrroli-
dino, piperidino, morpholino, piperazino, or hexahydro-
azepino radical, and their non-toxic salts, which are use-
ful as sedatives, anti-depressants, antihistaminics, anti-
serotonics, analgesics, and spasmolytics.

---

This invention relates to dibenzocycloheptadiene de-
rivatives, their preparation, and pharmaceutical composi-
tions containing them.

The present invention provides new dibenzo[a,d]cyclo-
heptadiene derivatives of the general formula:

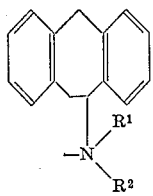

and their acid additio salts and quaternary ammonium
derivatives, in which $R^1$ and $R^2$, which are identical or
different, are hydrogen, alkyl, hydroxyalkyl or dialkyl-
aminoalkyl, and $R^2$ may in addition be an alkanoyl radi-
cal; or —$NR^1R^2$ is a heterocyclic radical of the formula:

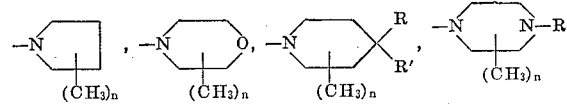

or

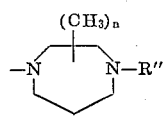

in which $n$ represents 0, 1, 2, 3 or 4, R and R' are each
hydrogen, hydroxy, alkyl, alkenyl, alkynyl, hydroxyalkyl,
hydroxyalkoxyalkyl, alkoxy, monoalkylamino, dialkyl-
amino, N-alkyl-alkanoylamino, phenyl, phenylalkyl or
phenylalkenyl with the proviso that R is not hydroxy or
alkoxy when R is a monoalkylamino, dialkylamino, N-
alkyl-alkanoylamino or hydroxy, or R and R' together
form an oxo group, and R'' is hydrogen, alkyl, alkenyl,
alkynyl, hydroxyalkyl, hydroxyalkoxyalkyl, alkoxycar-
bonylalkyl, carbamoylalkyl, N-alkylcarbamoylalkyl, N,N-
dialkylcarbamoylalkyl, phenyl, phenylalkyl or phenyl-
alkenyl; the aforesaid phenyl radicals being optionally
substituted by halogen, alkyl, alkoxy, nitro, amino, cyano,
or trifluoromethyl; and the aforesaid alkyl, alkenyl, alkyn-
yl, alkoxy, and alkanoyl radicals each containing a maxi-
mum of 5 carbon atoms.

According to a feature of the invention, the compounds
of the general Formula I are prepared by reacting together
a reactive ester of the general formula:

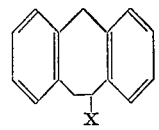

in which X represents a reactive ester residue, such as a
halogen atom or a sulphuric or sulphonic ester residue
(for example a methanesulphonyloxy or toluene-p-sul-
phonyloxy residue), and an amine of the general formula:

$$HNR^1R^2 \qquad \text{III}$$

in which $R^1$ and $R^2$ are as previously defined. It is advan-
tageous to carry out the reaction in an inert organic sol-
vent such as an aromatic hydrocarbon, preferably at the
boiling temperature of the solvent, and to use as condens-
ing agent an excess of the amine of the general Formula
III.

The compounds of general Formula II may be prepared
from the corresponding alcohol of the formula:

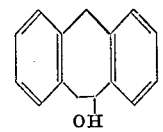

described by F. J. Villani et coll., J. Med. Pharm. Chem.
5, 373 (1962), by conventional methods of preparing re-
active esters from the corresponding alcohols.

The compounds of the Formula I in which

represents a heterocyclic radical of the formula:

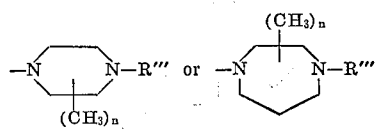

in which $n$ is as previously defined and R''' is the same as
R'' but not hydrogen or phenyl, may also be prepared, in
accordance with a further feature of the invention, by
reaction of a dibenzo[a,d]cycloheptadiene of the general
formula:

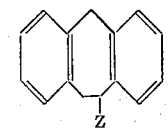

in which Z represents

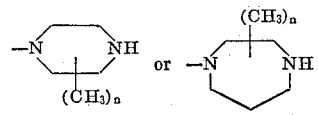

with a compound of the general formula:

$$X\text{—}R''' \qquad \text{V}$$

in which R''' and X are as previously defined. It is advan-
tageous to carry out the reaction in an inert organic sol-
vent, such as ethanol, preferably at the boiling tempera-
ture of the solvent, and to use as condensing agent an
excess of the compound of the general Formula IV.

The compound of the general Formula I in which

represents the group —NH₂ may also be prepared in accordance with a feature of the invention, by reducing the compound of formula:

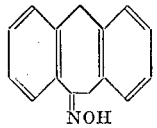

by the conventional methods of reducing oximes to amines, more especially by the action of sodium in ethanol.

It is within the scope of the invention to perpare compounds of general Formula I from other compounds of general Formula I by conventional chemical processes, such as hydrolysis, acylation, reduction, and oxidation, of radicals present in the grouping

The compounds of the general Formula I may optionally be purified by physical methods (such as distillation, crystallisation or chromatography) or by chemical methods (such as the formation of salts, crystallisation of the latter and decomposition in alkaline medium). In these operations, the nature of the anion of the salt is immaterial, the only condition being that the salt should be well-defined and readily crystallisable.

The compounds of Formula I and their acid addition salts and quaternary ammonium derivatives have interesting pharmacodynamic properties. They are very active in particular on the central nervous system as sedatives and anti-depressants. They also have a good antihistaminic, antiserothoninic, analgesic and spasmolytic activity. Particularly interesting compounds are those of the general formula:

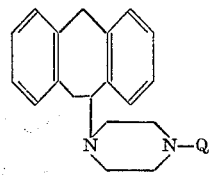

in which Q represents hydrogen, alkyl of 1 to 5 carbon atoms, especially methyl or ethyl, hydroxyethyl, hydroxyethoxyethyl, benzyl, benzyl substituted in the o-, m- or p-position by methyl, 2-phenylethyl, or cinnamyl.

For medicinal use, the new compounds are employed either as the bases, or in the form of pharmaceutically acceptable acid addition salts or quaternary ammonium derivatives, that is to say, those which are non-toxic in the doses in which they are employed. As examples of pharmaceutically acceptable addition salts, there may be mentioned mineral acid salts (such as hydrochlorides, sulphates, nitrates or phosphatse) and organic acid salts (such as acetates, propionates, succinates, benzoates, fumarates, maleates theophyllineacetates, salicylates, or methylene-bis-β-hydroxynaphthoates) as well as substitution derivatives of these acids.

As examples of pharmaceutically acceptable quaternary ammonium salts, there may be mentioned derivatives of mineral and organic acids, such as methyl, ethyl, allyl or benzyl chloride, bromide or iodide, methyl or ethyl sulphate or benzenesulphonate, and substitution derivatives of these comopunds.

The acid addition salts may be obtained by the action of the bases of Formula I on acids in appropriate solvents. As organic solvent, there may be employed, for example, alcohols, ethers, ketones, or chlorinated solvents. The salt formed precipitates after optional concentration of its solution and is separated by filtration or decantation. The quaternary ammonium derivatives may be obtained by the action of the new compounds on esters, optionally in an organic solvent, at normal temperature or more rapidly with moderate heating.

The invention includes within its scope pharmaceutical compositions comprising a compound of Formula I or non-toxic acid addition salt or quaternary ammonium derivative thereof in association with a pharmaceutically acceptable carrier compatible therewith. Such medicinal compositions may be suitable for oral, rectal or parenteral administration, and generally contain 5 to 95% by weight of active substance in the case of compositions for oral or rectal administration.

Solid compositions for oral administration may be tablets, pills, powders or granules. In these compositions, the active product is mixed with one or more inert diluents, such as sucrose, lactose or starch. These compositions may also comprise substances other than diluents, for example a lubricant, such as magnesium stearate.

Liquid compositions for oral administration may be emulsions, solutions, suspensions, syrups or elixirs containing inert diluents, such as water or liquid paraffin. These compositions may also comprise substances other than diluents, for example wetting agents, sweetening agents, or perfumes.

The compositions according to the invention for parenteral administration may be sterile aqueous or non-aqueous solutions, suspensions or emulsions. As solvent or vehicle, there may be employed (besides water) propylene glycol, polyethylene glycol, vegetable oils, more especially olive oil, and injectable organic esters, for example ethyl oleate. The compositions may also contain adjuvants, more especially wetting agents, emulsifying agents and dispersing agents. The sterilisation may be carried out in various ways, for example with the aid of a bacteriological filter, by incorporating sterilising agents in the composition, by irradiation or by heating. The compositions may also be prepared in the form of sterile solid compositions which may be dissolved at the time of use in sterile water or other injectable sterile medium.

Compositions for rectal administration are suppositories which contain, in addition to the active product, excipients such as cacao butter or suppository wax.

The doses to be employed depend upon the desired therapeutic effect, the route of administration, and the duration of the treatment. When orally administered, a suitable dose may be between 5 mg. and 100 mg. of active product per day for an adult.

The following examples illustrate the invention.

Example 1

To a solution of 6.30 g. of 10-hydroxydibenzo[a,d] cycloheptadiene in 60 cc. of anhydrous chloroform, cooled on an ice bath, a solution of 10.7 g. of thionyl chloride in 45 cc. of anhydrous chloroform is added in 15 minutes, the temperature being kept at or below 5° C. The reaction mixture is maintained for 1 hour at 5° C. and then for 3 hours at 25° C. The solvents are then evaporated in vacuo, internal temperature being kept below 30° C. The residue obtained is taken up in 30 cc. of anhydrous benzene and the solvent is again evaporated in vacuo.

The 10-chlorodibenzo[a,d]cycloheptadiene thus prepared is dissolved in 60 cc. of anhydrous benzene, and this solution is added in 10 minutes to a solution of 18.0 g. of 1-methylpiperazine in 60 cc. of anhydrous benzene under reflux. The reaction mixture is then heated under reflux for 18 hours. After cooling, 100 cc. of diethyl ether and 100 cc. of distilled water are successively added. The separated organic phase is washed three times to neutrality with 150 cc. of distilled water in all and then extracted successively with 50 cc. of any aqueous 2 N acetic acid solution and 15 cc. of an aqueous 2 N hydrochloric acid solution. The combined acid extracts are made alkaline with 15 cc. of sodium hydroxide solution (d=1.33). The product which is salted out is extracted three times with a total of 200 cc. of diethyl ether. The combined ethereal extracts are dried over anhydrous potassium carbonate and then evaporated. The solid residue (4 g.) is recrystallised from 30 cc. of diisopropyl ether. After cooling to 0° C., the crystals obtained are separated, washed with 4 cc. of ice-cold diisopropyl ether and dried in vacuo. 3.30 g. of 10-(4-methylpiperazino)dibenzo[a,d]cycloheptadiene, M.P. 127.5° C., are obtained. After recrystallisation from ethyl acetate, the pure product melts at 128° C.

Example 2

A solution of crude 10-chlorodibenzo[a,d]cycloheptadiene (obtained as described in Example 1, but starting with 10.5 g. of 10-hydroxydibenzo[a,d]cycloheptadiene) in 50 cc. of anhydrous benzene is added in an autoclave to 235 cc. of a solution of dimethylamine in benzene (containing 2.12 moles of dimethylamine per litre of solution). The reaction mixture is heated for 24 hours at 100° C. After cooling, the products of the reaction are treated with 250 cc. of diethyl ether and 150 cc. of distilled water. The organic solution is separated, washed four times with a total of 400 cc. of distilled water, and finally extracted twice with a total of 130 cc. of an aqueous 2 N hydrochloric acid solution. The combined acid extracts are washed twice with a total of 140 cc. of diethyl ether and then made alkaline with 34 cc. of sodium hydroxide solution (d.=1.33). The oil salted out is twice extracted with a total of 140 cc. of diethyl ether. The combined ethereal solutions are dried over anhydrous potassium carbonate and evaporated. The oily residue (3.65 g.) is dissolved in 5.5 cc. of ethanol and treated with 5.5 cc. of an anhydrous solution of hydrogen chloride in diethyl ether (containing 3.1 moles of hydrogen chloride per litre of solution), and then with 5.5 cc. of anhydrous ether. After cooling to 0° C., the crystals which have appeared are separated and washed with 8 cc. of a mixture of ethanol and diethyl ether (1:2 by volume) and then twice with a total of 16 cc. of diethyl ether. After drying in vacuo, 3.55 g. of 10-dimethylaminodibenzo[a,d]cycloheptadiene hydrochloride, M.P. about 228–230° C. (decomposition), are obtained.

Example 3

A solution of crude 10-chlorodibenzo[a,d]cycloheptadiene (obtained as described in Example 1 from 6.3 g. of 10-hydroxydibenzo[a,d]cycloheptadiene) in 60 cc. of anhydrous benzene is added in 25 minutes to a solution, heated under reflux, of 20 g. of 1-ethylpiperazine in 60 cc. of anhydrous benzene. The reaction mixture is then heated under reflux for 20 hours. After cooling, 100 cc. of diethyl ether and 100 cc. of distilled water are added. The decanted organic phase is washed eight times (to neutrality) with a total of 400 cc. of distilled water, and then successively extracted with 120 cc. of an aqueous 2 N acetic acid solution and 25 cc. of an aqueous 2 N hydrochloric acid solution. The combined acid extracts are washed with 50 cc. of diethyl ether and then made alkaline with 60 cc. of sodium hydroxide solution (10 N). The product which salts out is twice extracted with a total of 150 cc. of diethyl ether. The combined ethereal solutions are dried over anhydrous potassium carbonate and evaporated. The oily residue (3.7 g.) is dissolved in 10 cc. of ethanol and treated with 8 cc. of an anhydrous solution of hydrogen chloride in diethyl ether (containing 3 moles of hydrogen chloride per litre). After cooling to 0° C., the crystals which have appeared are separated and washed three times with a total of 30 cc. of a mixture in equal volumes of diethyl ether and ethanol. After drying under reduced pressure, 4.7 g. of product are obtained, which is recrystallised from 200 cc. of ethanol. 4.3 g. of 10-(4-ethylpiperazino)dibenzo[a,d]cycloheptadiene dihydrochloride, M.P. about 234–235° C., are thus obtained.

Example 4

A solution of crude 10-chlorodibenzo[a,d]cycloheptadiene (obtained as described in Example 1 from 6.3 g. of 10-hydroxydibenzo[a,d]cycloheptadiene) in 50 cc. of anhydrous benzene is added in 2 hours to a solution, heated under reflux, of 25.2 g. of 1-β-hydroxyethylpiperazine in 60 cc. of anhydrous benzene. The reaction mixture is then heated under reflux for 5 hours. After cooling, there are added 100 cc. of diethyl ether and 100 cc. of water. The separated organic phase is washed six times (to neutrality) with a total of 600 cc. of distilled water and then extracted three times with 120 cc. of an aqueous N methanesulphonic acid solution. The combined acid extracts are washed with 50 cc. of diethyl ether and then made alkaline with 20 cc. of 10 N sodium hydroxide solution. The base is twice extracted with a total of 100 cc. of methylene chloride and the solution obtained is dried over anhydrous sodium sulphate and evaporated. The solid residue (4 g.) is recrystallised from 30 cc. of diisopropyl ether. After cooling to 0° C., the crystals obtained are separated and washed with 5 cc. of diisopropyl ether. After drying under reduced pressure, 3.8 g. of 10-[4-(2-hydroxyethyl)piperazino]
      dibenzo[a,d]cycloheptadiene M.P. 100° C., are obtained.

Example 5

By proceeding as in Example 4, starting with 6.3 g. 10-hydroxydibenzo[a,d]cycloheptadiene and 31.3 g. of 1-β-hydroxyethoxyethylpiperazine, 4.6 g. of 10-[4-(2'-hydroxy - 2 - ethoxyethyl)piperazino]dibenzo[a,d]cycloheptadiene, M.P. 72° C., are obtained, after recrystallisation from 45 cc. of diisopropyl ether.

Example 6

By proceeding as in Example 4, starting with 15.8 g. of 10-hydroxydibenzo[a,d]cycloheptadiene and 43 g. of anhydrous piperazine, 5.6 g. of 10-piperazinodibenzo-[a,d]cycloheptadiene, M.P. 114° C., are obtained, after recrystallisation from 25 cc. of diisopropyl ether.

Example 7

By proceeding as in Example 4, starting with 6.3 g. of 10-hydroxydibenzo[a,d]cycloheptadiene and 20.6 g. of 1-cinnamylpiperazine, with heating under reflux for 20 hours, 5.2 g. of 10-(4-cinnamylpiperazino)dibenzo[a,d] cycloheptadiene, M.P. 95° C., are obtained, after recrystallisation from 30 cc. of diisopropyl ether.

Example 8

By proceeding as in Example 4, starting with 6.3 g. of 10-hydroxydibenzo[a,d]cycloheptadiene and 31.5 g. of 1-benzylpiperazine, with heating under reflux for 20 hours, 4.1 g. of 10-(4-benzylpiperazino)dibenzo[a,d]cycloheptadiene, M.P. 143° C., are obtained, after recrystallisation from 120 cc. of diisopropyl ether.

Example 9

By proceeding as in Example 4, starting with 6.3 g. of 10-hydroxydibenzo[a,d]cycloheptadiene and 34 g. of 1-(3-methylbenzyl)piperazine, with heating under reflux for 20 hours, 4.6 g. of 10-[4-(3-methylbenzyl)piperazino] dibenzo[a,d]cycloheptadiene, M.P. 110° C., are obtained, after recrystallisation from 60 cc. of heptane.

Example 10

To a solution of 4.8 g. of 10-(4-methylpiperazino)dibenzo[a,d]cycloheptadiene in 24 cc. of anhydrous acetone are added drop-by-drop in 5 minutes, 6.4 g. of dimethyl sulphate. The temperature rises from 25° C. to 40° C. The reaction medium is allowed to return to ambient temperature in 3 hours. A white product crystallises out, and the reaction mixture is cooled to 5° C. for 45 minutes.

The crystals obtained are separated, washed twice with a total of 10 cc. of iced anhydrous acetone and dried under reduced pressure. 5.8 g. of 4-(dibenzo[a,d]-10-cycloheptadienyl)-1,1-dimethylpiperazinium methosulphate, M.P. about 158–162° C., are thus obtained.

Example 11

A solution of crude 10-chlorodibenzo[a,d]cycloheptadiene (obtained as described in Example 1 from 12.6 g. of 10-hydroxydibenzo[a,d]cycloheptadiene) in 200 cc. of anhydrous benzene is added in 10 minutes to a solution, heated under reflux, of 30.6 g. of N,N,N′-trimethylethylenediamine in 100 cc. of anhydrous benzene. The mixture is then heated under reflux for 17 hours. After cooling, 250 cc. of diethyl ether and 250 cc. of distilled water are added. The separated aqueous phase is washed with 200 cc. of diethyl ether. The combined organic solutions are extracted three times with a total of 600 cc. of an aqueous 2 N methanesulphonic acid solution. The combined acid extracts are washed with 200 cc. of diethyl ether and then made alkaline, with cooling on an ice bath, with 150 cc. 10 N sodium hydroxide solution. The base is extracted three times with a total of 600 cc. of diethyl ether. The combined ethereal solutions are washed with 75 cc. of distilled water, dried over anhydrous potassium carbonate, and evaporated. The oily residue (6.60 g.) is dissolved in 20 cc. of anhydrous ethanol and treated with 5.0 cc. of an anhydrous solution of hydrogen chloride in ethanol (containing 4.2 moles of hydrogen chloride per litre of solution). The solution obtained is diluted with 130 cc. of anhydrous diethyl ether until it begins to go turbid. On seeding, crystals appear. After cooling for 2 hours at 50° C., the crystals are separated, washed three times with a total of 120 cc. of anhydrous diethyl ether, and dried under reduced pressure at 40° C. This product becomes hydrated in the presence of moist air to give a monohydrate. 6.1 g. of 10-(N-methyl-N-dimethylaminoethyl - amino)dibenzo[a,d]cycloheptadiene monohydrochloride, containing about 5% of water, M.P. about 130–133° C., are obtained.

Example 12

To a solution of 0.47 g. of 10-piperazinodibenzo[a,d]cycloheptadiene in 10 cc. of anhydrous ethanol, is added a solution of 0.11 g. of benzyl chloride in 10 cc. of anhydrous ethanol. The reaction mixture is heated under reflux for 7 hours. The ethanol is evaporated under reduced pressure. The residue is taken up with 6 cc. of 2 N methanesulphonic acid and 20 cc. of diethyl ether. The acid is decanted and then gradually brought to a pH of 5 by the addition of aqueous sodium bicarbonate solution. The oil which appears is extracted three times with a total of 70 cc. of diethyl ether. The combined ethereal solutions are dried over anhydrous magnesium sulphate and evaporated. The residue (0.31 g.) is re-crystallised from ethyl acetate. 0.16 g. of 10-(4-benzylpiperazino)dibenzo[a,d]cycloheptadiene, M.P. 145–146° C., is obtained.

Example 13

To a solution of 16.7 g. of 10-piperazinodibenzo[a,d]cycloheptadiene in 250 cc. of anhydrous ethanol, is added a solution of 4.70 g. of p-methoxybenzyl chloride in 20 cc. of anhydrous ethanol. The reaction mixture is heated under reflux for 11 hours, and the ethanol is then evaporated under reduced pressure. The residue obtained is treated with 70 cc. of 2 N methanesulphonic acid, 50 cc. of distilled water and 120 cc. of diethyl ether. The acid solution is decanted and then gradually brought to a pH of 5 by the adition of a 2 N sodium hydroxide solution. The oil which appears is extracted with 200 cc. of methylene chloride and then washed three times with a total of 300 cc. of distilled water. After drying over anhydrous sodium sulphate, the methylene chloride solution is evaporated. The oily residue (8.9 g) is dissolved in 35 cc. of boiling acetonitrile. After cooling for 4 hours at 3° C., the crystals which have appeared are separated, washed twice with a total of 20 cc. of ice-cold acetonitrile, and dried in vacuo. 6.65 g. of 10-[4-(4-methoxybenzyl)piperazino]dibenzo[a,d]cycloheptadiene, M.P. 130° C., are obtained.

Example 14

By proceeding as in Example 13, starting with 16.7 g. of 10 - piperazinodibenzo[a,d]cycloheptadiene and 4.83 g. of p-chlorobenzyl chloride, 9.6 g. of 10-[4-(4-chlorobenzyl)piperazino]dibenzo[a,d]cycloheptadiene, M.P. 164° C., are obtained, after crystallisation from 120 cc. of ethyl acetate.

Example 15

By proceeding as in Example 13, starting with 15.0 g. of 10-piperazinodibenzo[a,d]cycloheptadiene and 3.90 g. of p-fluorobenzyl chloride, 5.2 g. of 10-[4-(4-fluorobenzyl)piperazino]dibenzo[a,d]cycloheptadiene M.P. 98° C., are obtained, after recrystallisation from 25 cc. of diisopropyl ether.

Example 16

By proceeding as in Example 13, starting with 36.7 g. of 10-piperazinodibenzo[a,d]cycloheptadiene and 11.35 g. of p-nitrobenzyl chloride, 22.1 g. of 10-[4-(4-nitrobenzyl)piperazino]dibenzo[a,d]cycloheptadiene, M.P. 172° C., are obtained, after recrystallisation from 300 cc. of ethyl acetate.

Example 17

A suspension of 12.5 g. of 10-(4-p-nitrobenzylpiperazino)dibenzo[a,d]cycloheptadiene in 500 cc. of anhydrous methanol is hydrogenated at normal pressure and temperature in the presence of 2.4 g. of Adams' platinum. The reaction is complete in 2 hours. After filtration of the catalyst, the solution is evaporated under reduced pressure. The residue is taken up in 50 cc. of 2 N methanesulphonic acid, 100 cc. of distilled water and 100 cc. of ether. The separated acid solution is made alkaline with 50 cc. of sodium hydroxide solution (d.=1.33) and extracted twice with a total of 150 cc. of methylene chloride. The combined methylene chloride solutions are twice washed with a total of 140 cc. of distilled water, dried over anhydrous sodium sulphate and evaporated. The oily residue obtained (11.9 g.) is dissolved in 90 cc. of boiling ethanol, and 30 cc. of boiling distilled water are then added. The clear solution obtained is cooled at 3° C. for 24 hours. The crystals which have appeared are separated, washed twice with a total of 50 cc. of an ice-cold mixture of ethanol and water (3:1 by volume), and dried under reduced pressure. 9.6 g. of 10-[4-(4-aminbenzyl)piperazino[a,d]cycloheptadiene, M.P. 132–133° C., are obtained.

Example 18

A solution of crude 10-chlorodibenzo[a,d]cycloheptadiene obtained as described in Example 1 from 21.0 g. of 10-hyroxydibenzo[a,d]cycloheptadiene) in 150 cc. of anhydrous benzene is added in 30 minutes to a solution, heated under reflux, of 38.0 g. of 1-(1-phenylethyl)piperazine in 150 cc. of anhydrous benzene. The reaction mixture is then heated under reflux for 13 hours. After cooling, 150 cc. of diethyl ether, 200 cc. of distilled water and 10 cc. of sodium hydroxide solution (d=1.33) are added. The separated organic solution is extracted three times with a total of 390 cc. of 2 N methanesulphonic acid. The combined acid solutions are washed with 150 cc. of diethyl ether and made alkaline with 100 cc. of sodium hydroxide solution (d=1.33). The oil which is salted out is extracted twice with a total of 400 cc. of diethyl ether. The combined ethereal solutions are washed to neutrality with distilled water, dried over anhydrous potassium carbonate and evaporated. The residue (14.4 g.) is formed of a mixture of the two diastereoisomers of 10-[4-(1-phenylethyl)piperazino]dibenzo[a,d]cycloheptadiene.

The separation of these two forms can be carried out in the following manner. The residue (14.4 g.) is dissolved at elevated temperature in 40 cc. of ethyl acetate. After coollng for 6 hours at 3° C., the crystals which have appeared are separated, washed twice with a total of 25 cc. of ice-cold ethyl acetate and dried under reduced pressure. There are obtained 7.9 g. of crystals A melting at about 105–110° C. On evaporation of the filtrate, a residue A' (6.5 g.) is recovered. On re-crystallisation of the crystals A (7.9 g.) from 30 cc. of ethyl acetate, 4.6 g. of crystals B, M.P. about 114–118° C., are isolated. On treatment of crystals B in 35 cc. of acetonitrile with 6.65 g. of picric acid, a crystalline dipicrate C (10.2 g.) is isolated, M.P. 199–200° C. On treatment with an aqueous ethanolamine solution, the dipicrate C gives 4.0 g. of an oily base, from which can be isolated, by treatment with 55 cc. of diisopropyl ether, 2.17 g. of crystals D, M.P. about 130° C. Further crystallisation from diisopropyl ether gives crystals E melting distinctly at 136° C. and consisting of one of the pure forms (called α) of 10-[4-(1-phenylethyl)-piperazino]dibenzo[a,d]cycloheptadiene.

Residue A' (6.5 g.), dissolved in 45 cc. of acetonitrile and treated with 9.95 g. of picric acid, gives a crystalline dipicrate B' (10.4 g.), M.P. about 185–187° C. On treatment with an aqueous ethanolamine solution, there can be isolated from this dipicrate B', 4.05 g. of an oily base which when dissolved in 62 cc. of diisopropyl ether at elevated temperature, and cooled at 3–5° C. for 15 hours, gives 3.15 g. of crystals C', M.P. 96–98° C. This melting point is not changed by further crystallisation from diisopropyl ether. These crystals C' represent the second form (called β) of 10-[4-(1-phenylethyl)-piperazino]dibenzo[a,d]cycloheptadiene.

The starting 1-(1-phenylethyl)piperazine (B.P./0.25 mm. Hg.=114–115° C.) is prepared by the action of 1-1-chloro-1-phenylethane on anhydrous piperazine in ethanol.

Example 19

A solution of crude 10-chlorodibenzo[a,d]cycloheptadiene (obtained as described in Example 1 from 21.0 g. of 10-hydroxydibenzo[a,d]cycloheptadiene) in 80 cc. of anhydrous benzene is added in 30 minutes to a solution, heated under reflex, of 32.4 g. of 1-phenylpiperazine in 150 cc. of anhydrous benzene. The reflux is maintained for 17 hours, and, after cooling, the reaction mixture is treated with 200 cc. of distilled water, 150 cc. of diethyl ether and 10 cc. of sodium hydroxide solution (d.=1.33). The separated organic solution is extracted four times with a total of 450 cc. of 2 N aqueous acetic acid solution (to eliminate excess 1-phenylpiperazine) and then four times with a total of 550 cc. of 2 M methanesulphonic acid. The methanesulphonic acid solutions are combined, made alkaline with 150 cc. of sodium hydroxide solution (d.=1.33) and extracted four times with a total of 1300 cc. of diethyl ether. The combined ethereal solutions are washed with distilled water until they are neutral, dried over anhydrous potassium carbonate and evaporated. The crystallised residue (8.1 g.) is dissolved at elevated temperature in 50 cc. of acetonitrile. After cooling for 24 hours at 3° C., the crystals which have appeared are separated, washed with 9 cc. of ice-cold acetonitrile and dried under reduced pressure. 7.4 g. of 10-(4-phenylpiperazino)dibenzo[a,d]cycloheptadiene, M.P. 132–134° C., are obtained.

Example 20

A solution of crude 10-chlorodibenzo[a,d]cycloheptadiene (obtained as described in Example 1 from 31.5 g. of 10-hydroxydibenzo[a,d]cycloheptadiene) in 120 cc. of anhydrous benzene is added in 35 minutes to a solution, heated under reflux, 33.5 g. of 1-methylhexahydroazepine in 200 cc. of anhydrous benzene. The reaction mixture is then heated under reflux for 13 hours. After cooling, 250 cc. of distilled water, 250 cc. of diethyl ether and 20 cc. of sodium hydroxide solution (d.=1.33) are added. The separated organic solution is extracted three times with a total of 250 cc. of 2 N methanesulphonic acid. The combined acid solutions are washed with 150 cc. of diethyl ether and then made alkaline with 75 cc. of sodium hydroxide solution (d.=1.33). The product which is salted out is extracted twice with a total of 350 cc. of diethyl ether. The combined ethereal solutions are washed four times, to neutrality, with a total of 800 cc. of distilled water, dried over anhydrous potassium carbonate and evaporated. The oily residue (19.0 g.), dissolved in 50 cc. of absolute ethanol, is treated with 11.5 cc. of an anhydrous solution of hydrogen chloride in diethyl ether (containing 4.9 moles of hydrogen chloride per litre of solution) and then with 39 cc. of anhydrous diethyl ether. After cooling for 5 hours at 3° C., the crystals which have appeared are separated, washed twice with a total of 60 cc. of a mixture of anhydrous ethanol and anhydrous diethyl ether (1:1 by volume), then twice with a total of 60 cc. of anhydrous diethyl ether, and finally dried under reduced pressure. 14.0 g. of 10-(4 - methylhexahydroazepino) - dibenzo[a,d]cycloheptadiene monohydrochloride, M.P. about 190–195° C., are obtained.

Example 21

A solution of crude 10-chlorodibenzo[a,d]cycloheptadiene (obtained as described in Example 1 from 21.0 g. of 10-hydroxydibenzo[a,d]cycloheptadiene) in 100 cc. of anhydrous benzene is added in 45 minutes to a solution, heated under reflux, of 38.8 g. of 1-benzyl-hexahydroazepine in 100 c. of anhydrous benzene. The reaction mixture is then heated under reflux for 14 hours. After cooling, 250 c. of distilled water, 20 cc. of sodium hydroxide solution (d.=1.33), and 150 cc. of diethyl ether are added. The organic solution is separated and then extracted three times with a total of 300 cc. of 2 N methanesulphonic acid. The combined acid solutions are washed with 150 cc. of diethyl ether, and then treated with sodium hydroxide solution (d.=1.33) to a pH of 8–9. The oil which is salted out is extracted three times with a total of 300 cc. of ethyl acetate. The combined organic solutions are washed three times, to neutrality, with a total of 750 cc. of distilled water, dried oved anhydrous potassium carbonate and evaporated. The oily residue (20 g.) is dissolved in 65 cc. of boiling acetone, and 7.5 cc. of distilled water are added. After cooling for 5 hours at 3° C., the crystals which have appeared are separated, washed three times with a total of 100 cc. of acetone containing 10% water, and dried under reduced pressure. 14.5 g. of 10-(4-benzyl-hexahydroazepino)dibenzo[a,d]cycloheptadiene, M.P. 86° C., are obtained.

Example 22

A solution of crude 10-chlorodibenzo[a,d]cycloheptadiene (obtained as described in Example 1 from 14 g. of 10-hydroxydibenzo[a,d]-cycloheptadiene) in 50 cc. of anhydrous benzene is added in 15 minutes to a solution, heated under reflux, of 35.1 g. of 4-(N-methylacetamido)piperidine in 120 cc. of anhydrous benzene. The reaction mixture is then heated under reflux for 10 hours. After cooling, 150 cc. of distilled water, 75 cc. of diethyl ether, and 1 cc. of sodium hydroxide solution (d.=1.33) are added. The separated organic solution is extracted three times with a total of 450 cc. of 2 N methanesulphonic acid. The combined acid solutions are made alkaline with 100 cc. of soduim hydroxide solution (d.=1.33), and the oil which is salted out is extracted three times with a total of 350 cc. of methylene chloride. The combined methylene chloride solutions are washed to neutrality with distilled water, dried over anhydrous sodium sulphate and evaporated. The oily residue (10 g.) is dissolved at elevated temperature in 30 cc. of ethyl acetate. After cooling for 4 hours at 3° C., the crystals which have appeared are separated, washed twice with a total of 20 cc. of ice-cold ethyl acetate and dried under reduced pressure. 6.1 g. of 10-[4-(N-methylacetamido)

piperidino]dibenzo[a,d]cycloheptadiene, M.P. 160° C., are obtained.

Example 23

A solution of 6.7 g. of 10-[4-(N-methylacetamido)piperidino]-dibenzo[a,d]cycloheptadiene in 72 cc. of 2 N hydrohloric acid is heated under reflux for 48 hours. After cooling, the solution obtained is extracted with 20 cc. of diethyl ether, and then made alkaline with 25 cc. of sodium hydroxide solution (d.=1.33). A crystalline product appears, which is extracted three times with a total of 300 c. of methylene chloride. The combined methylene chloride solutions are washed twice, to neutrality, with a total of 100 cc. of distilled water, dried over anhydrous potassium carbonate and evaporated. The residue which crystallises (5.3 g.) is dissolved in 20 cc. of anhydrous ethanol and treated with 9.0 cc. of an anhydrous solution of hydrogen chloride in ethanol (containing 4.5 moles of hydrogen chloride per litre of solution). After cooling for 17 hours at 3° C., the crystals which have appeared are separated, washed twice with a total of 15 cc. of ice-cold anhydrous ethanol, and dried under reduced pressure. In the presence of moist air, the crystals absorb water, and 6.0 g. of the dihydrochloride of 10-(4-methylaminopiperidino)dibenzo[a,d]cycloheptadiene monohydrate, M.P. about 260° C., are obtained.

Example 24

A solution of crude 10-chlorodibenzo[a,d]cycloheptadiene (obtained as described in Example 1 from 12.6 g. of 10-hydroxydibenzo-[a,d]cycloheptadiene) in 40 cc. of anhydrous benzene is added in 10 minutes to a solution, heated under reflux, of 15.0 g. of 4-dimethylaminopiperidine in 95 cc. of anhydrous benzene. The reaction mixture is heated under reflux for 10 hours. After cooling, 200 cc. of distilled water, 100 cc. of diethyl ether and 1 cc. of sodium hydroxide solution (d=1.33) are added. The decanted organic solution is extracted three times with a total of 450 cc. of 2 N methanesulphonic acid. The combined acid solutions are made alkaline with 100 cc. of sodium hydroxide (d=1.33). The oil which is salted out is extracted three times with a total of 300 cc. of methylene chloride. The combined methylene chloride solutions are dried over anhydrous sodium sulphate and evaporated. The oily residue (4.5 g) is dissolved in 15 cc. of anhydrous ethanol and treated with 7.0 cc. of an anhydrous solution of hydrogen chloride in ethanol (containing 4.5 moles of hydrogen chloride per litre of solution). After cooling for 15 hours at 3° C., the crystals which have appeared are separated, washed with 5 cc. of anhydrous ethanol, and dried under reduced pressure. 3.75 g. of the dihydrochloride of 10 - (4-dimethylaminopiperidino)dibenzo[a,d]cycloheptadiene, M.P. about 258–260° C., are obtained.

4-dimethylaminopiperidine (B.P./20 mm. Hg.=77–78° C.) is obtained by hydrogenation of 4-dimethylamino-1-benzylpiperidine in methanol, in the presence of palladium on carbon black, at 100° C., under an initial hydrogen pressure of 80 bars. 4-dimethylamino-1-benzylpiperidine (dihydrochloride: M.P. about 270° C.) is prepared by hydrogenation of a solution of 1-benzyl-4-piperidone and dimethylamine in ethanol, at normal pressure and temperature in the presence of Raney nickel.

Example 25

To a solution of crude 10-chlorodibenzo[a,d]cycloheptadiene (obtained as described in Example 1 from 15.7 g. of 10-hydroxydibenzo[a,d]-cycloheptadiene) in 50 cc. of anhydrous benzene are added 500 cc. of a solution in benzene of monomethylamine (containing 2.73 moles of monomethylamine per litre of solution). The reaction mixture is heated in an antoclave at 100° C. for 13 hours. After cooling, 250 cc. of distilled water and 5 cc. of sodium hydroxide solution (d=1.33) are added. The separated benzene solution is extracted three times with a total of 350 cc. of 2 N methanesulphonic acid. The combined acid solutions are washed with 150 cc. of diethyl ether and then made alkaline with 90 cc. of sodium hydroxide solution (d=1.33). The oil which is salted out is extracted twice with a total of 350 cc. of diethyl ether. The combined ethereal solutions are washed three times, to neutrality, with a total of 900 cc. of distilled water, dried over anhydrous potassium carbonate, and evaporated. The oily residue (6.7 g.) is dissolved in 25 cc. of absolute ethanol and treated with 7.35 cc. of an anhydrous solution of hydrogen chloride in ethanol (containing 4.5 moles of hydrogen chloride per litre of solution). After cooling for 15 hours at 3° C., the crystals which have appeared are separated, washed twice with a total of 35 cc. of absolute ethanol, and then with 20 cc. of diethyl ether, and dried under reduced pressure. 7.3 g. of 10-methylaminodibenzo[a,d]cycloheptadiene hydrochloride, M.P. about 252° C., are obtained.

Example 26

A solution of crude 10-chlorodibenzo[a,d]cycloheptadiene (obtained as described in Example 1 from 13.0 g. of 10-hydroxydibenzo[a,d]cycloheptadiene) in 90 cc. of anhydrous benzene added in 30 minutes to a mixture of 37.2 g. of ethanolamine and 100 cc. of benzene, heated under reflux. The reaction mixture is heated under reflux for 13 hours. After cooling, 100 cc. of distilled water, 150 cc. of diethyl ether, and 5 cc. of sodium hydroxide solution (d=1.33) are added. The organic solution is washed twice, to neutrality, with a toal of 300 cc. of distilled water and then extrated twice with a total of 300 cc. of 2 N methanesulphonic acid. The combined acid solutions are made alkaline with 75 cc. of sodium hydroxide solution (d=1.33) and then extracted twice with a total of 400 cc. of diethyl ether. The combined ethereal solutions are washed three times, to neutrality, with a total of 450 cc. of distilled water and then dried over anhydrous potassium carbonate and evaporated. The crystallised residue (11.5 g.) dissolved in 30 cc. of boiling acetonitrile. After cooling for 15 hours at 3° C., the crystals which have appeared are separated, washed twice with a total of 30 cc. of ice-cold acetonitrile and dried under reduced pressure. 9.6 g. of 10-β-hydroxyethylaminodibenzo[a,d]cycloheptadiene, M.P. 112° C., are obtained.

Example 27

A solution of crude 10-chlorodibenzo[a,d]cycloheptadiene (obtained as described in Example 1 from 14.0 g. of 10-hydroxydibenzo[a,d]cycloheptadiene) in 50 cc. of anhydrous benzene is added in 15 minutes to a solution, heated under reflux, of 26.4 g. of N,N-dimethylethylenediamine in 120 cc. of anhydrous benzene. The reaction mixture is heated under reflux for 10 hours. After cooling, 150 cc. of distilled water, 250 cc. of diethyl ether and 1 cc. of sodium hydroxide solution (d.=1.33) are added. The organic solution is washed four times with a total of 160 cc. of distilled water and then extracted three times with a total of 200 cc. of 2 N methanesulphonic acid. The combined acid solutions are made alkaline with 50 cc. of sodium hydroxide solution (d.=1.33) and extracted three times with a total of 300 cc. of diethyl ether. The combined ethereal solutions are washed three times, to neutrality, with a total of 180 cc. of distilled water, dried over anhydrous sodium sulphate, and evaporated. The oily residue (10.0 g.) is dissolved in 20 cc. of anhydrous ethanol and treated with 7.6 cc. of an anhydrous solution of hydrogen chloride in ethanol (containing 4.5 moles of hydrogen chloride per litre of solution) and then with 85 cc. of diethyl ether. A moderate turbidity which appears is dissolved by adding 3 cc. of anhydrous ethanol. After cooling at 3° C. for 15 hours, the crystals which have appeared are separated, washed four times with a total of 70 cc. of anhydrous acetone and then twice with a total of 25 cc. of diethyl ether and dried under reduced pressure. 7.9 g. of 10-(2-dimethylaminoethylamino)-dibenzo[a,d]cycloheptadiene monohydrochloride, M.P. about 156–158° C., are obtained.

Example 28

A solution of 3.2 g. of propionyl chloride in 5 cc. of anhydrous acetone is added in 3 minutes to a solution, maintained at a temperature between 30° and 35° C., of 8.7 g. of 10-(2-dimethylaminoethylamino)dibenzo-[a,d] cycloheptadiene in 30 cc. of anhydrous acetone. Crystals gradually appear. After 4 hours at 25° C., the reaction mixture is cooled for 2 hours at 3° C. The crystals are separated, washed four times with a total of 16 cc. of ice-cold anhydrous acetone, and dried in vacuo. In the presence of moist air, the product absorbs water, and 5.25 g. of the hydrochloride of N-(2-dimethylaminoethyl)-10-propionamidodibenzo[a,d]cycloheptadiene monohydrate, M.P. about 188–192° C., are obtained.

Example 29

A solution of crude 10-chlorodibenzo[a,d]cycloheptadiene (obtained as described in Example 1 from 15.7 g. of 10-hydroxydibenzo[a,d]cycloheptadiene) in 100 cc. of anhydrous benzene is added to a solution, heated under reflux, of 29.7 g. of N,N-dimethyl-N'-β-hydroxyethyl-ethylenediamine in 150 cc. of anhydrous benzene. The reaction mixture is heated under reflux for 13 hours. After cooling, 250 cc. of distilled water, 200 cc. of diethyl ether and 10 cc. of sodium hydroxide solution (d.=1.33) are added. The decanted organic solution is extracted twice with a total of 350 cc. of 2 N methanesulphonic acid. The combined acid solutions are washed with 150 cc. of diethyl ether, and made alkaline with 90 cc. of sodium hydroxide solution (d.=1.33). The oil which is salted out is extracted with 200 cc. of diethyl ether. The decanted ethereal solution is washed three times, to neutrality, with a total of 750 cc. of distilled water, dried over anhydrous potassium carbonate and evaporated. The oily residue (6.0 g.) is dissolved in 10 cc. of boiling acetonitrile. After cooling for 15 hours at 3–5° C., the crystals which have appeared are separated, washed with 3 cc. of ice-cold acetonitrile, and dried under reduced pressure. 2.75 g. of 10-N-(β-hydroxyethyl) - N - (2 - dimethylaminoethyl) aminodibenzo[a,d]cycloheptadiene, M.P. 78–80° C., are obtained.

Example 30

A solution of crude 10-chlorodibenzo[a,d]cycloheptadiene (obtained as described in Example 1 from 15.0 g. of 10-hydroxydibenzo[a,d]cycloheptadiene) in 60 cc. of anhydrous benzene is added to a solution, heated under reflux, of 29 g. of 4-hydroxypiperidine in 128 cc. of anhydrous benzene. The reaction mixture is heated under reflux for 10 hours. After cooling, 150 cc. of distilled water, 200 cc. of diethyl ether, and 1 cc. of sodium hydroxide solution (d.=1.33) are added. The separated organic solution is washed five times, to neutrality, with a total of 250 cc. of distilled water and extracted three times with a total of 200 cc. of 2 N methanesulphonic acid. The combined acid solutions are made alkaline with 60 cc. of sodium hydroxide solution (d.=1.33). The oil which is salted out is extracted three times with a total of 300 cc. of diethyl ether. The combined ethereal solutions are dried over anhydrous potassium carbonate and evaporated. The crystallised residue (11.8 g.) is dissolved in 18 cc. of boiling ethyl acetate. After cooling for 15 hours at 3° C., the crystals which have appeared are separated, washed twice with a total of 8 cc. of ice-cold ethyl acetate, and dried under reduced pressure. 8.25 g. of 10-(4-hydroxypiperidino)dibenzo[a,d]cycloheptadiene, M.P. 128° C., are obtained.

Example 31

A solution of crude 10-chlorodibenzo[a,d]cycloheptadiene (obtained as described in Example 1 from 31.5 g. of 10-hydroxydibenzo[a,d]cycloheptadiene) in 150 cc. of anhydrous benzene is added to a suspension, heated under reflux, of 53.1 g. of 4-phenyl-4-hydroxypiperidine in 200 cc. of anhydrous benzene. The reaction mixture is heated under reflux for 10 hours. After cooling, 200 cc. of distilled water, 200 cc. of diethyl ether, and 25 cc. of sodium hydroxide solution (d.=1.33) are added. The insoluble matter is separated and the filtrate is decanted. The organic solution is washed to neutrality with distilled water, and then extracted three times with a total of 500 cc. of 2 N methanesulphonic acid. The combined acid solutions are made alkaline with 150 cc. of sodium hydroxide solution (d.=1.33) and are twice extracted with a total of 300 cc. of diethyl ether. The combined ethereal solutions are washed three times, to neutrality, with a total of 300 cc. of distilled water, dried over anhydrous potassium carbonate, and evaporated. The crystallised residue (18 g.) is dissolved at elevated temperature in 130 cc. of acetonitrile. After cooling for 15 hours at 3° C., the crystals which have appeared are separated, twice washed with a total of 40 cc. of ice-cold acetonitrile, and dried at 60° C. under reduced pressure. 13.0 g. of 10-(4-phenyl-4 - hydroxypiperidino)dibenzo[a,d]cycloheptadine M.P. 156° C., are obtained.

Example 32

A solution of crude 10-chlorodibenzo[a,d]cycloheptadiene (obtained as described in Example 1 from 7.9 g. of 10-hydroxydibenzo[a,d]cycloheptanediene) in 25 cc. of anhydrous benzene is added to a solution, heated under reflux, of 26 g. of 4,4-diethoxypiperidine in 64 cc. of anhydrous benzene. The reaction mixture is heated under reflux for 10 hours. After cooling, 75 cc. of distilled water, 100 cc. of diethyl ether, and 1 cc. of sodium hydroxide solution (d.=1.33) are added. The separated organic solution is washed to neutrality with distilled water and then extracted three times with a total of 100 cc. of 2 N methanesulphonic acid. The combined acid solutions are heated under reflux for 1 hour. After cooling, the solution is made alkaline with 25 cc. of sodium hydroxide solution (d.=1.33) and extracted three times with a total of 200 cc. of benzene. The combined benzene solutions are dried over anhydrous magnesium sulphate and evaporated. The residue (6 g.) is dissolved at elevated temperature in 12 cc. of boiling acetonitrile. After cooling for 15 hours at 3° C., the crystals which have appeared are separated, washed twice with a total of 8 cc. of ice-cold acetonitrile and dried under reduced pressure. 4.9 g. of 10-(4-oxopiperidino)-dibenzo[a,d] cycloheptadiene, M.P. 125–128° C., are obtained.

Example 33

To a solution of 35.0 g. of 10-hydroximinodibenzo-[a,d]cycloheptadiene in 350 cc. of butanol heated under reflux are added in small portions, in 60 minutes, 25.4 g. of sodium. The heating under reflux is maintained for 45 more minutes, and, after cooling, 500 cc. of distilled water are added. The butanol-water azeotrope is then distilled off, and when the temperature of the vapours reaches 99–100° C., the distillation is stopped, the product is cooled and 100 cc. of distilled water and 400 cc. of diethyl ether are added. The separated ethereal solution is extracted three times with a total of 600 cc. of 2 N methanesulphonic acid. The combined acid solutions are washed with 100 cc. of diethyl ether and then made alkaline with 150 cc. of sodium hydroxide solution (d.=1.33). The oil which is salted out is extracted four times with a total of 800 cc. of diethyl ether. The combined ethereal solutions are washed to neutrality with distilled water, dried over anhydrous potassium carbonate and evaporated. The oily residue (23.1 g.) is dissolved in 70 cc. of anhydrous ethanol and treated with 20.5 cc. of an anhydrous solution of hydrogen chloride in ethanol (containing 5.4 moles of hydrogen chloride per litre of solution). After cooling for 15 hours at 3- C., the crystals which have appeared are separated, washed three times with a total of 30 cc. of ice-cold anhydrous ethanol, and dried under reduced pressure. 22.5 g. of 10-aminodibenzo[a,d]cycloheptadiene hydrochloride, M.P. about 260–265° C., are obtained. The base melts at 81–83° C.

10 - hydroximinodibenzo[a,d]cycloheptadiene, M.P. 184° C., used as starting material, is prepared in accordance wtih the procedure of Rigaudy et al., Bull. Soc. Chim. Fr. (1959), 642.

Example 34

A solution of crude 10-chlorodibenzo[a,d]cycloheptadiene (obtained as described in Example 1 from 6.3 g. of 10-hydroxydibenzo[a,d,]cycloheptadiene) in 60 cc. of anhydrous benzene is added in 30 minutes to a solution, heated under reflux, of 22.8 g. of 1-(2-methylbenzyl)-piperazine in 60 cc. of anhydrous benzene. Heating under reflux is maintained for 20 hours. After cooling, 100 cc. of diethyl ether and 100 cc. of water are aded. The decanted organic layer is washed with 10 litres of water (to neutrality), then extracted four times with a total of 150 cc. of N methanesulphonic acid, and washed with 60 cc. of water. The acid extracts are washed with 60 cc. of diethyl ether and then made alkaline with 20 cc. of sodium hydroxide solution (d.=1.33). The liberated base is extracted three times with a total of 150 cc. of methylene chloride. The methylene chloride solution obtained is dried over anhydrous sodium sulphat and concentrated under reduced pressure. The 7.3 g. of crude base obtained are recrystallised from 45 cc. of heptane. 4.8 g. of 10-[4-(2 - methylbenzyl)piperazino]dibenzo[a,d]cycloheptadiene, M.P. 138° C., are obtained.

1 - (2 - methylbenzyl)piperazine (b.p./0.9 mm. Hg=113-115° C.) is obtained by the action of 2-methylbenzyl bromide on piperazine in methanol.

Example 35

Proceeding as in Example 34, but replacing 1-(2-methylbenzyl)piperazine by 22.8 g. of 1-(4-methylbenzyl) piperazine, 3.6 g. of 10-[4-(4-methylbenzyl)piperazino] dibenzo[a,d]cycloheptadiene, M.P. 135° C., are obtained, after recrystallisation from heptane.

Example 36

By proceeding as in Example 34, but starting with the 10 - chlorodibenzo[a,d]cycloheptadiene emanating from 9.45 g. of 10-hydroxydibenzo[a,d]cycloheptadiene and 25.6 g. of 1-phenethylpiperazine, 7.8 g. of 10-(4-phenethylpiperazino) dibenzo[a,d]cycloheptadiene, M.P. 136° C., are obtained, after recrystallisation from isopropanol.

Example 37

By proceeding as in Example 34, starting with the 10-chlorodibenzo[a,d]cycloheptadiene emanating from 9.45 g. of 10 - hydroxydibenzo[a,d]cycloheptadiene and 31.3 g. of 1 - (4 - t - butylbenzyl)piperazine, 16.4 g. of crude base are obtained which, after recrystallisation from 55 cc. of isopropanol, give 6 g. of base still containing a little 1-(4-t-butylbenzyl)piperazine. This base is dissolved in 200 cc. of diethyl ether, stirred with 12 cc. of N methanesulphonic acid, and the pH is adjusted to 4–5 by small additions of N sodium hydroxide solution. The ethereal layer with a little crystalline methanesulphonate is stirred with 50 cc. of N sodium hydroxide and then with 50 cc. of water. The layer is then dried over anhydrous sodium sulphate and concentrated, and the residue is recrystallised from 38 cc. of isopropanol. 4.6 g. of 10-[4-(4-t-butylbenzyl) piperazino]dibenzo[a,d]cycloheptadiene, M.P. 127–128° C., are obtained.

Example 38

Proceeding as in Example 34, but starting with the 10-chlorodibenzo[a,d]cycloheptadiene emanating from 17.9 g. of 10-hydroxydibenzo[a,d]cycloheptadiene and 31.5 g. of 1-allylpiperazine, 11.4 g. of 10-(4-allylpiperazino)dibenzo[a,d]cycloheptadiene, M.P. 80–82° C., are obtained, after recrystallisation from isopropanol.

Example 39

Proceeding as in Example 34, but starting with the 10-chlorodibenzo[a,d]cycloheptadiene emanating from 17.9 g. of 10-hydroxydibenzo[a,d]cycloheptadiene and 31 g. of 1-(propyn-2-yl)piperazine, 6.2 g. of 10-[4-(propyn - 2 - yl)piperazino]dibenzo[a,d]cycloheptadiene, M.P. 131° C., are obtained, after recrystallisation from isopropanol.

Example 40

A solution of 3.7 g. of 1-chloromethyl-4-cyanobenzene in 50 cc. of ethanol is added in 10 minutes to a solution, heated under reflux, of 13.5 g. of 10-piperazinodibenzo [a,d]cycloheptadiene in 200 cc. of ethanol. The mixture is heated under reflux for 18 hours and allowed to cool. The insoluble matter is filtered off, washed with 45 cc. of ethanol, and recrystallised from 350 cc. of ethyl acetate. 8.1 g. of 10-[4-(4-cyanobenzyl)piperazino]dibenzo [a,d]cycloheptadiene, M.P. 202° C., are obtained.

Example 41

By proceeding as in Example 34, but starting with the 10-chlorodibenzo[a,d]cycloheptadiene emanating from 17.9 g. of 10-hydroxydibenzo-[a,d]cycloheptadiene and 43 g. of 1-ethoxycarbonylmethylpiperazine (B.P./8 mm. Hg.=110–112° C.), 11.1 g. of 10-(4-ethoxycarbonylmethylpiperazino)-dibenzo[a,d]cycloheptadiene, M.P. 79° C., are obtained, after recrystallisation from diisopropyl ether.

Example 42

A solution of crude 10-chlorodibenzo[a,d]cycloheptadiene (obtained as described in Example 1 from 9.45 g. of 10-hydroxydibenzo[a,d]-cycloheptadiene) in 27 cc. of anhydrous benzene is poured in 5 minutes into 90 cc. of piperidine heated at 85–90° C. The mixture is heated for 3½ hours and then allowed to cool. The reaction mixture is stirred with 250 cc. of diethyl ether and 250 cc. of water. The ethereal layer is separated, washed with 3 litres of water until neutral, and then stirred with 80 cc. of N methanesulphonic acid solution, and finally with 40 cc. of water. The combined acid solutions are made alkaline with sodium hydroxide, and the liberated base is extracted with diethyl ether. After recrystallisation from diisopropyl ether, 2.4 g. of 10-piperidinodibenzo[a,d]cycloheptadiene, M.P. 82° C., are obtained.

Example 43

A solution of crude 10-chlorodibenzo[a,d,]cycloheptadiene (obtained as described in Example 1 from 6.3 g. of 10-hydroxydibenzo[a,d]-cycloheptadiene) in 50 cc. of benzene is added in 15 minutes to a boiling solution of 13 g. of pyrrolidine in 50 cc. of benzene. The mixture is heated under reflux for 16 hours and worked up as in Example 42. 3.1 g. of an oily base are obtained, the hydrochloride of which is prepared by dissolving the base in 20 cc. of isopropanol and adding an ethereal hydrogen chloride solution unti a pH of 4 is obtained. After cooling with ice, 3.2 g. of 10-pyrrolidinodibenzo[a,d]cycloheptadiene hydrochloride, M.P. 250 C., are obtained.

Example 44

By proceeding as in Example 43, but starting with 12.6 g. of 10-hydroxydibenzo[a,d]cycloheptadiene and 35.2 g. of diethylamine, 2.1 g. of crude base are obtained, the fumarate of which is prepared as follows. The hot solution of base in 12 cc. of ethyl acetate is mixed with a hot solution of 1.5 g. of fumaric acid in 22 cc. of ethanol. 2.6 g. of the acid fumarate of 10-diethylaminodibenzo [a,d]cycloheptadiene, M.P. 175° C., are obtained.

Example 45

Proceeding as in Example 43, but starting with 12.6 g. of 10-hydroxydibenzo[a,d]cycloheptadiene and 15.7 g. of morpholine, 5.9 g. of 10-morpholinodibenzo[a,d]cycloheptadiene, M.P. 116° C., are obtained, after recrystallisation from diisopropyl ether.

Example 46

6.4 g. of 10-(4-ethoxycarbonylmethylpiperazino)dibenzo[a,d]-cycloheptadiene are heated under reflux for 16 hours with 6.4 cc. of freshly distilled aniline. The excess of aniline is steam-distilled. The remaining resin is dissolved in 150 cc. of diethyl ether. The ethereal layer is stirred with 50 cc. of N methanesulphonic acid solution and 300 cc. of water. The aqueous acid layer is separated and made alkaline with 10 cc. of sodium hydroxide (d.=1.33) and the liberated base is extracted with 300 cc. of diethyl ether. The ethereal extract is dried over anhydrous sodium sulphate with the addition of decolorising charcoal. After filtration and evaporation under 20 mm. Hg, 3.7 g. of 10-(4-phenylcarbamoylmethylpiperazino[a,d]cycloheptadiene, which melts at 140° C. after recrystallisation from ethanol, are obtained.

Example 47

Tablets having the following composition are prepared by the usual method:

| | Mg. |
|---|---|
| 10 - (4 - methylpiperazino)dibenzo[a,d]cycloheptadiene | 5 |
| Starch | 110 |
| Colloidal silica | 32 |
| Magnesium stearate | 3 |

Example 48

Tablets having the following composition are prepared by the usual method:

| | Mg. |
|---|---|
| 10-(4-methylpiperazino)dibenzo[a,d]-cycloheptadiene | 25 |
| Starch | 92 |
| Colloidal silica | 30 |
| Magnesium stearate | 3 |

Example 49

Tablets having the following composition are prepared by the usual method:

| | Mg. |
|---|---|
| 10 - (4 - hydroxyethylpiperazino)dibenzo[a,d]cycloheptadiene | 25 |
| Starch | 92 |
| Colloidal silica | 30 |
| Magnesium stearate | 3 |

I claim:

1. A dibenzo[a,d]cycloheptadiene of the formula:

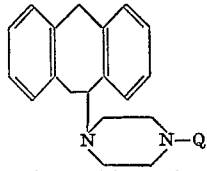

and its non-toxic acid addition salts, in which Q represents a member selected from the class consisting of hydrogen, alkyl of 1 to 5 carbon atoms, hydroxyethyl, hydroxyethoxyethyl, benzyl, benzyl substituted in one of the o-, m-, and p-positions by methyl, 2-phenylethyl, and cinnamyl.

2. A dibenzo[a,d]cycloheptadiene of the formula:

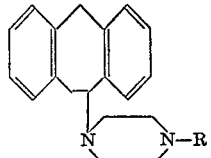

and its non-toxic acid addition salts in which R is hydrogen, alkyl, alkenyl, alkynyl, hydroxyalkyl, hydroxyalkoxyalkyl, alkoxycarbonylalkyl, phenylalkyl or phenylalkenyl; the aforesaid phenyl being unsubstituted or substituted by halogen, alkyl, alkoxy, nitro, amino, or cyano and the aforesaid alkyl, alkenyl, alkynyl, and alkoxy each having a maximum of 5 carbon atoms.

3. 10-(4 - cinnamylpiperazino)dibenzo[a,d]cycloheptadiene or a non-toxic acid addition salt thereof.

4. 10 - (piperazino)dibenzo[a,d]cycloheptadiene or a non-toxic acid addition salt thereof.

5. 10-(4 - methylpiperazino)dibenzo[a,d]cycloheptadiene or a non-toxic acid addition salt thereof.

6. 10-(4 - ethylpiperazino)dibenzo[a,d]cycloheptadiene or a non-toxic acid addition salt thereof.

7. 10 - [4 - (2 - hydroxyethyl)piperazino]dibenzo[a,d]cycloheptadiene or a non-toxic acid addition salt thereof.

8. 10-[4-(2' - hydroxy - 2 - ethoxyethyl)piperazino]dibenzo[a,d]cycloheptadiene or a non-toxic acid addition salt thereof.

9. 10-(4 - benzylpiperazino)dibenzo[a,d]cycloheptadiene or a non-toxic acid addition salt thereof.

10. 10-[4 - (2 - methylbenzyl)piperazino]dibenzo[a,d]cycloheptadiene or a non-toxic acid addition salt thereof.

11. 10-[4 - (3 - methylbenzyl)piperazino]dibenzo[a,d]cycloheptadiene or a non-toxic acid addition salt thereof.

12. 10-[4 - (4 - methylbenzyl)piperazino]dibenzo[a,d]cycloheptadiene or a non-toxic acid addition salt thereof.

13. 10-[4-(2 - phenylethyl)piperazino]dibenzo[a,d]cycloheptadiene or a non-toxic acid addition salt thereof.

References Cited

UNITED STATES PATENTS

| | | | |
|---|---|---|---|
| 3,317,543 | 5/1967 | Humber | 260—576 X |
| 3,052,721 | 9/1962 | Bernstein et al. | 260—562 |
| 3,167,541 | 1/1965 | Van der Stelt | 260—239 |
| 3,257,404 | 6/1966 | Fouche | 260—268 |

ALEX MAZEL, Primary Examiner

D. G. DAUS, Assistant Examiner

U.S. Cl. X.R.

260—239, 247, 256, 268, 294, 326, 456, 566, 567, 578, 579, 618, 649; 424—250